May 22, 1956     N. T. STARR     2,746,428
PRESSURE FLUID TELESCOPIC CYLINDER MOTOR
Filed June 13, 1951     2 Sheets-Sheet 2

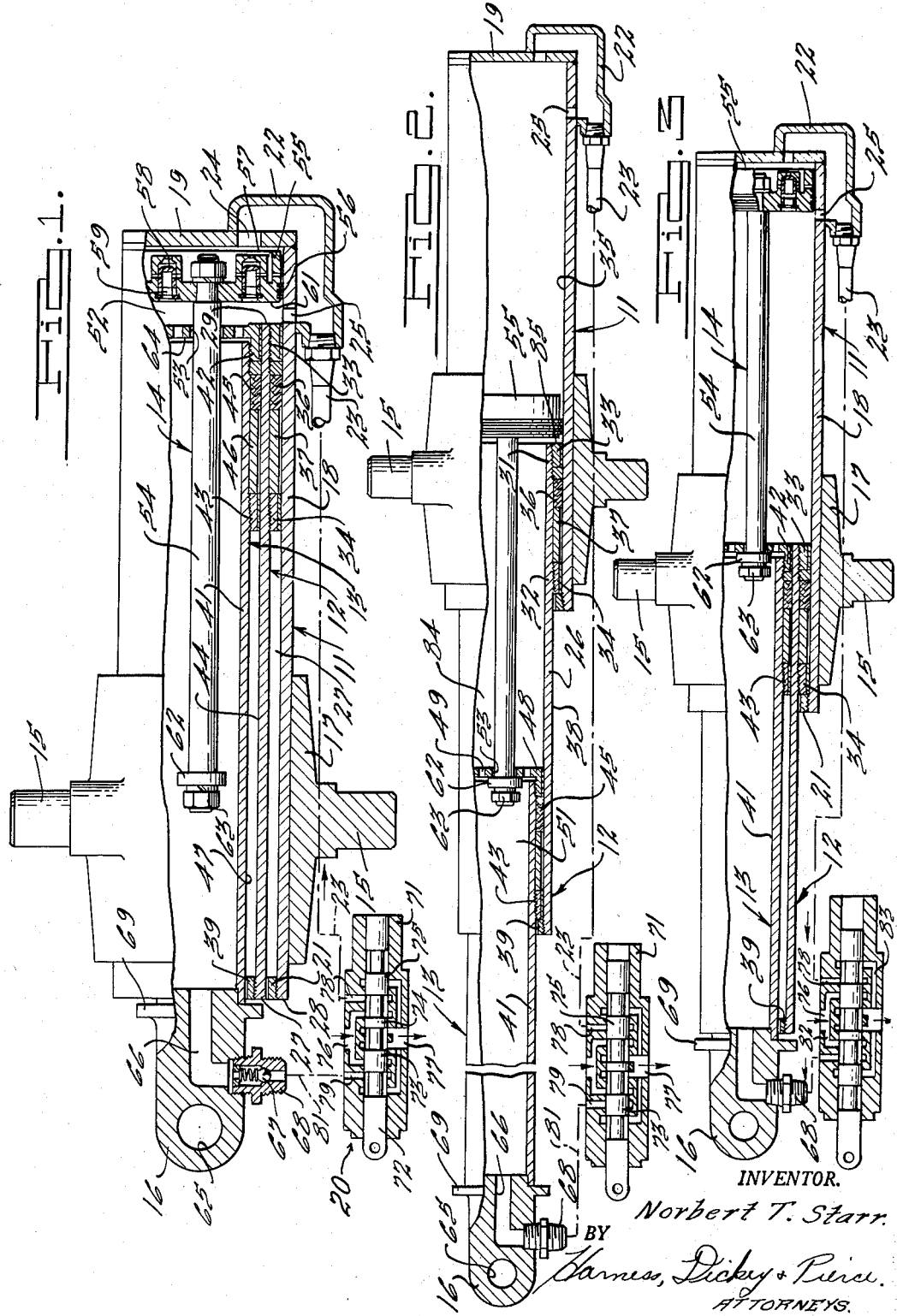

INVENTOR.
Norbert T. Starr.
BY
Harness, Dickey & Pierce
ATTORNEYS

United States Patent Office 2,746,428
Patented May 22, 1956

2,746,428
PRESSURE FLUID TELESCOPIC CYLINDER MOTOR

Norbert T. Starr, Detroit, Mich., assignor to Gar Wood Industries, Inc., Wayne, Mich., a corporation of Michigan Application June 13, 1951, Serial No. 231,315

12 Claims. (Cl. 121—46)

This invention relates to telescopic motors, and more particularly to extensible and retractable power units especially adapted for use in dump vehicles and other installations where a load-carrying body is to be tilted and then returned to its horizontal position.

It is an object of this invention to provide an improved telescopic power motor as described, in which the motor may be power-actuated when moving from its fully retracted to its fully extended position, and may thereafter be power-actuated from its fully extended position to a partially retracted position. In particular, it is an object to provide a telescopic hoist especially adapted for installations wherein the load-carrying body is pivoted to its support, and wherein tilting of the body moves its center of gravity past the pivot point, so that power means is necessary to initiate the return movement of the body, the return movement being completed by the weight of the body itself.

It is another object of this invention to provide a telescopic power down hoist as described, in which the retracting portion of the power movement is accomplished by a separate element within the structure which does not transmit force during the extending movement. More particularly, it is an object to provide a hoist comprising a plurality of telescopic members actuated by hydraulic means, some of said elements being acted upon by the hydraulic pressure only during the extending movement of said hoist, and another of said elements being operated by the fluid only during the power portion of the retracting stroke.

It is also an object of this invention to provide an improved telescopic hoist which is extremely inexpensive to fabricate, and in which there are a minimum number of finished surfaces on the telescopic elements without in any way impairing the efficiency or functioning of the unit.

Other objects, features, and advantages of the present invention will become apparent from the subsequent description taken in conjunction with the accompanying drawings.

In the drawing:

Figure 1 is a side view of the improved telescopic power hoist of this invention showing the parts in their fully retracted position, the view being partially in cross section for clarity, together with a valve for controlling the hoist;

Fig. 2 is a view similar to Fig. 1 but showing the parts in their fully extended position;

Fig. 3 is a view similar to Fig. 1, but showing the elements after the power portion of the retracting stroke has been completed;

Figure 4:
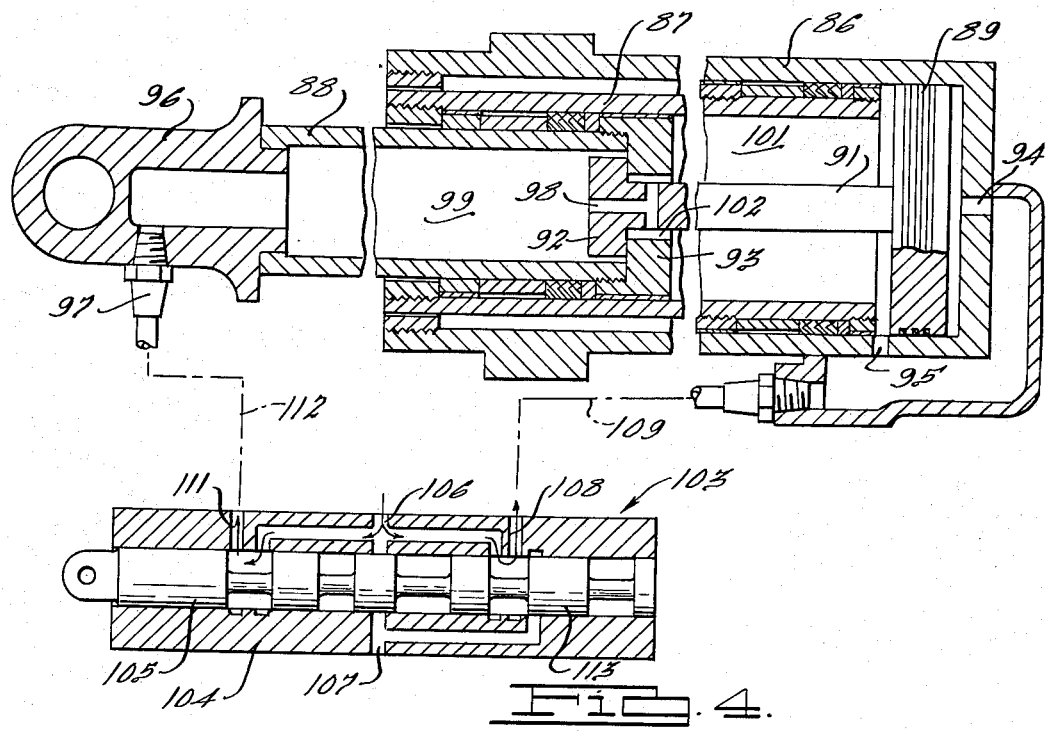
Fig. 4 is a cross-sectional view of a modified form of hoist which omits the check valves in the piston and has other features of difference, together with a valve for controlling the hoist, the hoist being shown in partially extended position and the valve in position for extending the hoist.

The invention provides a plurality of tubular elements in telescopic relation, together with a piston slidable within the outermost element and having a lost-motion connection, by means of a piston rod, with the innermost element. The invention further provides, in its most general aspect, means for supplying hydraulic fluid simultaneously to the tubular elements on both sides of said piston when the tubular elements are in collapsed position, whereby the elements are extended but without the piston transmitting any pressure forces. Further means are provided for supplying hydraulic fluid only to the side of the piston facing said innermost element when the elements are in extended position, and simultaneously relieving the fluid on the other side of the piston, thus forcing the piston to the other end of the outer telescopic element, carrying the inner element with it to thereby partially collapse the hoist. When the piston has reached the end of its power stroke, further means are provided for relieving the fluid on the side of the piston adjacent the innermost element, thus permitting the complete collapsing of the hoist, preferably by the weight of the dump body or other load which has been lifted.

Referring now more particularly to Figs. 1 to 3, the improved telescopic power hoist comprises, in general, a plurality of elements indicated generally as 11, 12, 13 and 14 which are in telescopic relation and which are movable between a retracted position as shown in Fig. 1 and a fully extended position as shown in Fig. 2. In the illustrated embodiment these elements are shown as adapted to be installed in a tiltable dump vehicle (not shown), and for this purpose the unit is provided with a pair of trunnions 15 which may be pivotally attached to the tilting body and a clevis 16 adapted to be pivotally supported by the truck chassis. It will be understood, however, that the principles of this invention are equally applicable to other types of installations. The trunnions 15 are secured by a ring 17 to element 11 of the hoist. This element comprises an outer cylindrical member 18 provided at one end with a head 19 and at its opposite end with an inwardly extending annular shoulder 21. For convenience of description, the end which carries head 19 will be referred to as the forward end, and the end provided with shoulder 21 as the rear end, it being understood that this language in the description and claims is not intended to limit the position of the hoist in its associated structure. The head 19 entirely encloses the forward end of the cylinder and adjacent that end is mounted a chamber 22 which serves to conduct air or other fluid under pressure to and from cylinder 18. This chamber is connected to a hydraulic valve 20, to be later described in detail, by a line 23, and is connected to cylinder 18 by a port 24 extending axially through head 19, and a second port 25 extending radially through the cylinder a short longitudinal distance from the head.

Intermediate hoist element 12 comprises a cylindrical member 26 which is disposed within cylinder 18 and is of such diameter as to leave an annular space 27 between the two cylinders when the unit is in retracted position. The length of cylinder 26 is substantially shorter than that of cylinder 18, the length being preferably such that when the rear ends 27 and 28 of cylinders 26 and 18, respectively, are aligned, the forward end 29 of cylinder 26 will leave port 25 uncovered. Extending rearwardly from the forward end 29 of cylinder 26 is a threaded portion 31, and spaced rearwardly from this portion is another threaded portion 32. These portions support respectively a pair of spaced guides 33 and 34 which engage the finished inner surface 35 of outer cylinder 18 to hold cylinder 26 in concentric sliding relation with the outer cylinder. A packing gland 36 and an annular spacer 37 are disposed between these two guides, and the axial distance between guides 33 and 34 is preferably such as to firmly support elements 11 and 12 against buckling under a compression load when fully extended. This will be the amount of minimum overlap which is conventional in fully extended ordinary telescopic hoists in which a finished outer surface extending for the full length of the inner cylinder fits a finished inner surface on the outer cylinder. It will be noted that due to this construction, the shoulder 21 at the rear end of cylinder 18 need not engage the outer surface 38 of intermediate cylinder 26 to support the latter cylinder, and that the surface 38 need therefore not be smoothly finished. This is especially important in minimizing the fabricating costs of the unit, since as is well known, the finishing costs are high and, moreover, the cost of finishing internal cylindrical surfaces is usually less than that for external surfaces.

In this connection it should be noted that the distance between the guide rings 33 and 34 determines the length of the overlapping fit which resists buckling of the cylinders and that distance remains the same in all positions of the cylinders. However, the tendency of any telescopic hoist to buckle under a compression load is always greatest when it is fully extended, because the hoist constitutes a column of greater length at that time. Therefore, the improved structure of this application, under the most adverse conditions, has the same resistance to buckling as the more expensive prior constructions, and the increased guiding length provided in the prior hoists as they shorten is of no advantage.

The rear end 27 of cylinder 26 is provided with a shoulder 39, similar to the shoulder 21 on cylinder 18, which cooperates with the inner telescopic element 13. This element comprises a cylinder member 41 similar to cylinders 18 and 26 and of a length substantially the same as cylinder 26. The forward portion of cylinder 41 is provided with a pair of spaced annular guides 42 and 43 similar to the guides 33 and 34 previously described. These guides are in sliding relation with the finished inner surface 44 of cylinder 26 and serve to firmly support cylinder 41 in concentric sliding relation therewith. A packing gland 45 and a spacer 46 are provided between guides 42 and 43, similar to the construction of intermediate section 12. It will be seen therefore that it is unnecessary to finish the outer surface 47 of cylinder 41, since the shoulder 39 need not be in supporting engagement therewith. The guide 42 forms part of a head 48 which is fixed to the forward end of cylinder 41. The main portion of this head is disk-shaped, and the head is provided with a plurality of ports 49 which connect the interior space 51 of cylinder 41 with the adjacent interior space 52 of outer cylinder 18.

A concentric clearance aperture 53 is also provided in head 48, and through this aperture extends a piston rod 54 which has fixed at its outer end a piston 55. This piston and piston rod form the inner hoist element 14, and the piston is slidably supported within outer cylinder 18 by means of piston rings 56. The forward face 57 of the piston is recessed, and a plurality of check valves 58 are disposed within this recessed portion. Check valves 58 are so arranged that upon fluid pressure being applied to the forward face 57 of the piston, the pressure on the forward faces of the valves will cause them to move to the left and open, allowing the fluid to pass through the piston by means of ports 59. However, upon greater pressure being applied to the rear face 61 of the piston than the forward face, the valves 58 will move to the right and close to prevent passage of fluid through the piston. Piston rod 54 extends within cylinder 41 when the parts are in their retracted position, and the rear end of the piston rod is provided with an annular shoulder 62 held in place by a nut 63. The width of shoulder 62 is preferably such that it will positively engage the rear face 64 of head 48 when the parts are in positions such as those shown in Figs. 2 and 3. There is thus a lost motion connection between the element 13 and the element 14, and this connection is preferably approximately equal to the maximum movement of element 13 relative to element 12.

The rear end of cylinder 41 has secured thereto the clevis 16 which, as stated previously, is provided with a journal aperture 65 for pivotally securing the clevis to the truck chassis. A port 66 extends axially through clevis 16 from chamber 51 within cylinder 41, and this port has a radial extension leading to a check valve 67 mounted on the clevis. The body of check valve 67 may be provided with a nipple 68 for connection to hydraulic valve 20. The check valve is so arranged that upon application of fluid pressure from valve 20, the check valve will open to allow fluid to pass through port 66 and into chamber 51. However, upon fluid pressure being carried from chamber 51 through port 66, the check valve will close, preventing escape from chamber 51. The clevis 16 is further provided with an annular shoulder 69 spaced outwardly from journal 65, the width of this shoulder being preferably such that it will engage the rear end 27 of intermediate cylinder 26 when these parts are brought together.

The valve 20 which controls the flow of hydraulic fluid to the unit comprises in general a valve body 71 and a reciprocating valve member 72 with the valve body and having axially spaced lands 73, 74 and 75. Port 76 is connected to a source of fluid pressure (not shown) and port 77 to a tank or reservoir (also not shown). Port 78 is connected to conduit 23, and port 79 is connected to check valve 67 by conduit 81. It will be seen from an examination of the figures that when the valve 72 is in the lifting position shown in Fig. 1, fluid pressure will be supplied directly to conduit 23 and therefore to ports 24 and 25, whereas port 79 will be connected to tank. Check valve 67 will, as stated previously, prevent fluid in chamber 51 from escaping to the tank. When the valve is in the position shown in Fig. 2, lands 73 and 75 will block ports 79 and 78 respectively, and port 76 will be connected to port 77, thus allowing the fluid from the pump to recirculate while the fluid within the hoist is locked against flow. When the valve is moved to its "power down" position, shown in Fig. 3, port 79 will be connected to the pump by passageway 82 leading from port 76, and fluid will thus be supplied to port 66 through check valve 67. At the same time, port 78 will be connected to the tank by a passageway 83 connected with port 77, thus allowing fluid to escape through ports 24 and 25. It will be understood that valves other than those illustrated could be used without departing from the principles of the invention.

The function and cooperation of the various parts may perhaps best be understood by a description of a complete cycle of events which take place during a lifting and lowering operation. Starting from an initial condition in which the tilting truck body is in its horizontal or lowered position, the telescopic hoist will be in a fully retracted position such as is shown in Fig. 1. It will be understood that for illustrative purposes the clevis 16 will be attached to the truck chassis and therefore will remain fixed throughout the operation, whereas the trunnions 15 are attached to the tilting body and therefore will be extended and retracted relative to the clevis. As the first step in the extending portion of the cycle, the fluid pressure will be applied through flexible connection 23 to chamber 22 and will enter cylinder 18 through ports 24 and 25. The fluid will pass through ports 49 into chamber 51, check valve 67 remaining closed to prevent escape of the fluid from chamber 51. Due to the pressure area differential between chambers 52 and 51, the cylinder 18 will begin to move forwardly (to the right in Fig. 1) relative to intermediate cylinder 26 and inner cylinder 41. Continuation of this movement will result in shoulder 21 engaging guide 34, and further forward movement of element 11 will therefore carry along intermediate element 12. The parts will eventually reach a fully extended position such as is shown in Fig. 2, in which shoulder 39 of element 12 will engage guide 43 of element 13. During this extending movement, element 14 will be carried forwardly in an idling movement until shoulder 62 engages head 48, after which outer cylinder 18 will slide forwardly relative to the piston. It will be understood that after the piston passes port 25, the fluid will continue to flow into chamber 51 within cylinder 41, and into chamber 84 within cylinder 26, by means of open check valves 58. It is important to observe that during the extending operation, the operative pressure surfaces will be those surfaces of elements 11, 12 and 13 which are subject to fluid pressure, but that element 14 will in no way take part in transmitting these pressure forces. This is due to the fact that check valves 58 will allow free passage of the fluid from face 57 to face 61 of the piston, and the pressure will thus be equalized on both sides of this member.

The hoist may be held in its fully extended position by the weight of the dump body, the center of gravity of which has preferably passed its pivot point. In any case the hoist will be positively locked by the movement of valve 20 into its blocking position shown in Fig. 2.

During the retracting movement it is necessary, as stated previously, to provide power operation during the first part of the stroke in order to bring the center of gravity of the tilted body past its pivot point. As the first step in the retracting sequence, the line 23 is disconnected from its source of fluid pressure and is connected instead to the reservoir or tank by valve 20, and at the same time, the source of fluid pressure is connected to the line 81, as shown in Fig. 3. The fluid will thus lift check valve 58 and pass through port 66 into chamber 51, and from this chamber through passageway 49 into chamber 84. Pressure will thus be created on the rear face 61 of piston 55, since check valves 58 will move to prevent the fluid from passing through the piston. Due to the connection of line 23 to the tank, only atmospheric pressure will exist at the forward face of the piston. The engagement of shoulder 62 with head 48 will cause element 14 to act as an extension of element 13, and the fluid pressure against the annular differential surface 85 at the forward end of section 12 will cause this section to be forced rearwardly over inner cylinder 41. The engagement of guide 34 with shoulder 21 will draw the outer section 11 rearwardly along with section 12, thus retracting trunnions 15 to start the lowering movement of the dump body. This action will continue until port 25 has been drawn past piston 55, at which time cylinder 26 will fully overlap cylinder 41 as shown in Fig. 3. The fluid pressure on the rear face of piston 55 will then be vented through port 25 to the atmosphere, relieving the pressure in the hoist. Since the center of gravity of the dump body has by this time passed its pivot connection to the truck chassis, the weight of the body reacting against trunnions 15 will cause outer cylinder 18 to collapse over the other two cylinders, at the same time forcing piston rod 54 within cylinder 41. The frictional forces in the fluid conections will impart a dashpot action to retard the lowering movement, or a separate restriction may be placed in the line for this purpose. In their final retracted position the elements will again thus be in their position shown in Fig. 1.

Figure 5:
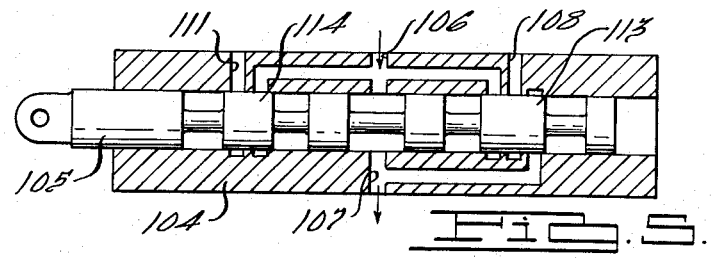
Fig. 5 is a cross-sectional view of the valve in its blocking position.
Figure 6:
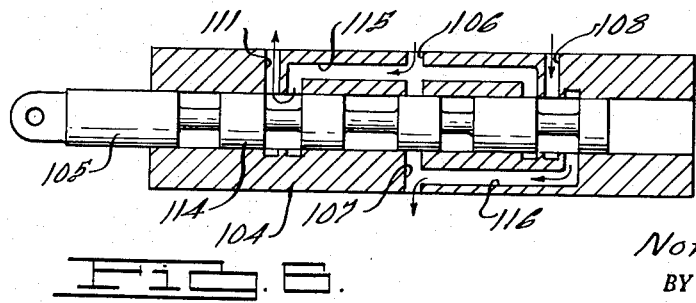
Fig. 6 is a view similar to Fig. 5 but showing the valve in its retracting position.

Figs. 4 to 6 illustrate a second embodiment of the invention which is similar in principle to the first modification, but which eliminates several of the elements thereof, principally the check valves 58 in the piston 55. The hydraulic system of this modification differs from that of the first embodiment in that the hydraulic fluid is supplied directly to both sides of the piston during the extending movement of the hoist, rather than being supplied to one side of the piston and flowing through the check valves to the other side.

In this embodiment outer element 86, intermediate element 87, and inner element 88 are provided which are in telescopic relation similar to the elements 11, 12 and 13 of the first embodiment. The hoist moreover is provided with a piston 89 slidable within outer element 86, and having the piston rod 91 with a shoulder 92 at the end thereof, the shoulder having a lost-motion connection with shoulder 93 of inner element 88. The outer element 86 is provided with ports 94 and 95 similar to ports 24 and 25 of the first embodiment and the clevis 96 attached to the end of inner element 88 has a fluid connection 97 corresponding to fluid connection 68 of the first modification. It will be noted, however, that there is no check valve disposed within connection 97. The piston 89 is of solid construction and also has no check valves for allowing the passage of fluid from one side to the other. A T-shaped passageway 98 in the end of piston rod 91 allows the free flow of fluid between chamber 99 of the inner element 88 and the chamber 101 within the intermediate and outer elements on the rod side of piston 89, this fluid flowing through the enlarged opening 102 at the end of element 88.

A valve generally indicated at 103 is provided for controlling the flow of fluid to the unit, and this valve comprises a valve body 104 and a slidable valve 105 having a plurality of lands which control the valve ports. Port 106 is connected to a source of fluid pressure (not shown) and port 107 to a tank or reservoir (also not shown). Port 108 is connected by conduit 109 to ports 94 and 95 of outer element 96, and the fluid connection 97 of the inner hoist element is connected to the valve by port 111 and conduit 112.

It will be seen that when the valve 103 is in the position shown in Fig. 4, port 103 will be connected both to ports 108 and 111 so that fluid under pressure will be supplied simultaneously to both sides of piston 89. The hoist will thus be extended in a manner similiar to that described for the embodiment of Figs. 1 to 3, and it will be observed that since the fluid is supplied simultaneously to both sides of the piston, check valves in the piston are not necessary to allow passage of the fluid. Fig. 4 shows the hoist in a partially extended position, with the inner element 88 extended from the other elements. When the hoist is in its fully extended position, the valve will be moved to its blocking position as shown in Fig. 5. When in this position, ports 108 and 111 are blocked by lands 113 and 114 respectively, so that the fluid is locked within the hoist to prevent retractive movement. At the same time, port 106 is connected directly to port 107, thus allowing a recirculation of the fluid from the pump to the tank. When it is desired to lower the hoist, the valve 105 is moved to the position shown in Fig. 6, in which port 111 is connected to the pump by means of passageway 115, and port 108 is connected to the tank through passageway 116. The fluid forced into chamber 99 will flow through passageways 98 and 102 into chamber 101 and thus against the adjacent piston face, retracting hoist element 88 within element 87 as in the previous embodiment. When piston 89 reaches the end of its stroke, chamber 101 will be connected to conduit 109 through port 95, and the weight of the truck body will collapse the elements into the final position as shown in Fig. 4.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

I claim:

1. A telescopic motor comprising an outer cylinder adapted to be connected to a movable body, a shoulder on said outer cylinder, an intermediate cylinder within said outer cylinder and slidable between a retracted position within said outer cylinder and an extended position against said shoulder, a shoulder on said intermediate cylinder, an inner cylinder slidably mounted within said intermediate cylinder and movable between a retracted position within said intermediate cylinder and an extended position against said intermediate cylinder shoulder, a piston slidable within said outer cylinder, a piston rod extending from said piston through the forward end of said inner cylinder, said piston rod having a lost motion connection to said inner cylinder approximately equal in length to the maximum movement of said inner cylinder relative to said intermediate cylinder, a fluid connection to said inner cylinder, and means for conducting fluid from said connection to said piston, whereby application of fluid pressure through said connection will cause retracting movement of said cylinders.

2. A telescopic motor comprising an inner cylinder, an intermediate cylinder and an outer cylinder, said cylinders being relatively slidable between a fully retracted and a fully extended position, a piston within said outer cylinder, a piston rod extending from said piston and having a lost motion connection to said inner cylinder approximately equal in length to the maximum movement of said inner cylinder relative to said intermediate cylinder, a fluid connection at one end of said outer cylinder, one-way valve means in said piston for allowing the fluid from said connection to pass within said intermediate and inner cylinders to move said cylinders to their extended position, a second fluid connection to said inner cylinder, and conducting means from said inner cylinder to that face of the piston which is remote from said first connection, application of fluid to said second fluid pressure connection holding said position and said inner cylinder in extended relation and causing said intermediate cylinder to move into retracted position relative to said inner cylinder.

3. In a telescopic motor, an inner cylinder having a fluid connection at one end thereof and a head at the opposite end thereof, a piston rod extending through said head and having a shouldered portion thereon engageable with said head when the piston rod is in extended position relative to said inner cylinder, an intermediate cylinder movable between extended and retracted positions relative to said inner cylinder, an outer cylinder movable between extended and retracted positions relative to said intermediate cylinder, a piston in said outer cylinder and integral with said piston rod, and a fluid connection at one end of said outer cylinder, application of fluid pressure to said last-mentioned connection causing said cylinders to move into relatively extended position and causing said piston rod to extend from said inner cylinder, application of fluid pressure to said first-mentioned connection causing said piston rod shoulder to operatively engage said inner cylinder and further forcing said intermediate cylinder into retracted position over said inner cylinder.

4. In a telescopic motor, an outer cylinder adapted for attachment to one of two relatively movable parts, a fluid pressure connection at one end of said cylinder, a piston within said cylinder and having a piston rod movable between a retracted position and a partially extended position, an intermediate cylinder within said outer cylinder and slidable between extended and retracted positions, an inner cylinder within said intermediate cylinder and slidable between extended and retracted positions, said piston rod being movable within said inner cylinder and engageable therewith when extending from said inner cylinder, check valve means within said piston for allowing fluid pressure to pass from said outer cylinder to said intermediate and inner cylinders to move these cylinders into extended relation, and a second fluid pressure connection to the face of said piston remote from said first connection, application of fluid pressure to said second connection closing said check valve means and holding said piston rod and inner cylinder in extended relation, said pressure also acting against a portion of said intermediate cylinder, whereby said intermediate cylinder will be forced over said inner cylinder.

5. In a telescopic motor, an inner cylinder adapted to be connected to one of a pair of relatively movable parts, a fluid pressure inlet port at one end of said cylinder, a head at the other end of said cylinder, said head having an aperture therethrough for the free passage of fluid, an intermediate cylinder surrounding said inner cylinder and in telescopic relation therewith, an outer cylinder in telescopic relation with said intermediate cylinder, a piston slidable within said outer cylinder, a piston rod attached to said piston and movable between a position within said inner cylinder and a position extending from said inner cylinder and engageable with the apertured head of said inner cylinder, a head at the end of said outer cylinder, a port in said head, a second port in said outer cylinder and longitudinally spaced from said head a distance slightly greater than the width of said piston, both of said ports being adapted for simultaneous connection to either a fluid pressure source or alternatively to the atmosphere, and a check valve in said piston for allowing fluid pressure to flow only from the face of said piston adjacent said outer cylinder head, application of fluid pressure to said outer cylinder ports causing said cylinders to move into fully extended relation, application of fluid pressure to said inner cylinder port and venting of said outer cylinder ports causing said inner and intermediate cylinders to move into relatively retracted position with said piston rod in operative engagement with said inner cylinder head and said piston adjacent said outer cylinder head.

6. The combination according to claim 5, further provided with a check valve at said inner cylinder inlet port, whereby no fluid is permitted to flow from said cylinder upon application of pressure to said outer cylinder ports.

7. A telescopic motor comprising a plurality of relatively slidable cylindrical members, means on the inner and outer of said cylinders for securing said motor between two relatively movable parts, a port in said outer cylinder adapted for connection to a fluid pressure source to extend said cylinders, a piston slidable within said outer cylinder and having a lost motion connection to said inner cylinder, a second port in said inner cylinder and adapted to conduct fluid therewithin, a port connecting said inner cylinder to said outer cylinder on the side of said piston having said lost motion connection, whereby application of fluid pressure to said inner cylinder port will retract said cylinders, control valve means movable between an extending position supplying fluid to said outer cylinder port and a retracting position supplying fluid to said inner cylinder port, and one-way valve means for allowing fluid flow from said outer to said inner cylinder when the control valve is in its extending position.

8. A telescopic motor comprising a plurality of relatively slidable cylindrical members, means on the inner and outer of said cylinders for securing said motor between two relatively movable parts, a port in said outer cylinder adapted for connection to a fluid pressure source to extend said cylinders, a piston slidable within said outer cylinder and having a lost motion connection to said inner cylinder, a second port in said inner cylinder and adapted to conduct fluid therewithin, a port connecting said inner cylinder to said outer cylinder on the side of said piston having said lost motion connection, whereby application of fluid pressure to said inner cylinder port will retract said cylinders, and control valve means movable between an extending position supplying fluid to said inner and outer cylinder ports and a retracting position supplying fluid only to said inner cylinder port.

9. A pressure fluid telescopic cylinder motor comprising a plurlaity of relatively slidable cylindrical members, a port in one of said cylinders adapted for connection to a fluid pressure source to extend said cylinders, a piston slidable within said cylinder, a second cylinder slidable within said first cylinder, a lost motion connection between said piston and said second cylinder, a second port in said second cylinder adapted to conduct fluid therewithin, and a port connecting said second cylinder to said first cylinder on the side of said piston having said lost motion connection, whereby application of fluid pressure to said second cylinder port will retract said cylinders.

10. A pressure fluid telescopic cylinder motor comprising a plurality of relatively slidable cylindrical members, a port in one of said cylinders adapted for connection to a fluid pressure source to extend said cylinders, a piston slidable within said cylinder, a second cylinder slidable within said first cylinder, a lost motion connection between said piston and said second cylinder, a second port in said second cylinder adapted to conduct fluid therewithin, a check valve at said second port so arranged as to prevent fluid flow from said second cylinder upon application of pressure to said first port, and a port connecting said second cylinder to said first cylinder on the side of said piston having said lost motion connection, whereby application of fluid pressure to said second cylinder port will retract said cylinders.

11. A telescopic motor comprising a first cylinder, a second cylinder larger than said first cylinder and slidably engaged therewith, a third cylinder larger than said second cylinder and slidably engaged with said second cylinder, a piston slidable within said third cylinder, a lost motion connection between said piston and said first cylinder, a fluid connection at one end of said third cylinder, and a by-pass from said fluid connection to the other side of said piston when the piston is adjacent said one end of the third cylinder.

12. A telescopic motor comprising a first cylinder, a second cylinder larger than said first cylinder and slidably engaged therewith, a third cylinder larger than said second cylinder and slidably engaged with said second cylinder, a piston slidable within said third cylinder, a lost motion connection between said piston and said first cylinder, a one-way valve in said piston permitting flow through said piston toward said first cylinder, a fluid connection at one end of said third cylinder, a by-pass from said fluid connection to the other side of said piston when the piston is at said one end of the third cylinder, a fluid connection at one end of said first cylinder, and a one-way valve in said last-mentioned fluid connection preventing fluid flow from said first cylinder.

References Cited in the file of this patent

UNITED STATES PATENTS

| | | |
|---|---|---|
| 884,884 | Apgar | Apr. 14, 1908 |
| 1,816,736 | Miller et al. | July 28, 1931 |
| 1,928,465 | Schultz | Sept. 26, 1933 |
| 2,151,057 | Suth | Mar. 21, 1939 |
| 2,161,659 | Shepard et al. | June 6, 1939 |
| 2,208,620 | Baisch | July 23, 1940 |
| 2,308,761 | Komph | Jan. 19, 1943 |

FOREIGN PATENTS

| | | |
|---|---|---|
| 300,733 | Great Britain | Nov. 22, 1928 |
| 569,311 | Great Britain | May 17, 1945 |
| 750,541 | France | May 29, 1933 |